(No Model.) 2 Sheets—Sheet 1.

W. HORSLEY.
VEHICLE WHEEL.

No. 540,020. Patented May 28, 1895.

Witnesses
Harry L. Amer.
L. P. Stothampted

Inventor
William Horsley.
By his Attorneys.
C. A. Snow & Co.

(No Model.) 2 Sheets—Sheet 2.

W. HORSLEY.
VEHICLE WHEEL.

No. 540,020. Patented May 28, 1895.

Witnesses
Harry L. Amer
L. P. Stelhauptt

Inventor
William Horsley.
By his Attorneys.
C. A. Snow & Co.

UNITED STATES PATENT OFFICE.

WILLIAM HORSLEY, OF TERRE HAUTE, INDIANA.

VEHICLE-WHEEL.

SPECIFICATION forming part of Letters Patent No. 540,020, dated May 28, 1895.

Application filed August 14, 1894. Serial No. 520,277. (No model.)

*To all whom it may concern:*

Be it known that I, WILLIAM HORSLEY, a citizen of the United States, residing at Terre Haute, in the county of Vigo and State of Indiana, have invented a new and useful Vehicle-Wheel, of which the following is a specification.

This invention relates to vehicle wheels; and it has for its object to provide a new and useful separable wheel, the various parts of which can be readily removed and replaced.

To this end the main and primary object of the present invention is to construct a vehicle wheel with a novel hub and rim portion that together provide simple means for readily removing and replacing any of the spokes should the same become broken, while at the same time completing an exceptionally strong and durable wheel, the various parts of which can always be maintained tight and rigid.

With these and many other objects in view, which will readily appear as the nature of the invention is better understood, the same consists in the novel construction, combination, and arrangement of parts hereinafter more fully described, illustrated, and claimed.

Figure 1:
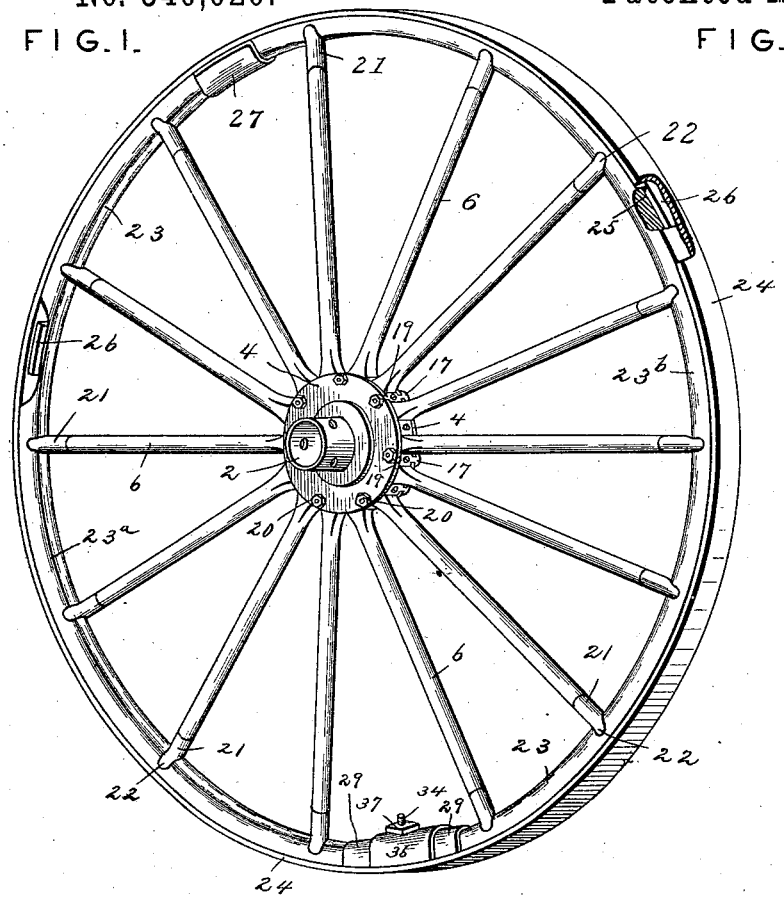
Figure 2:
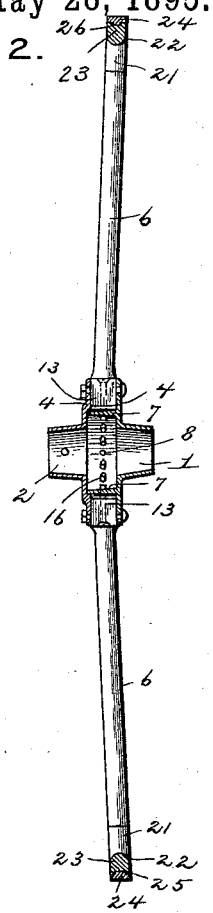
Figure 5:
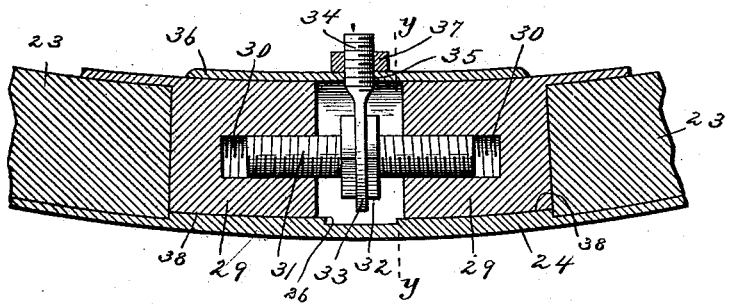
Figure 6:
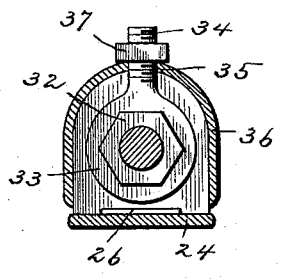
Figure 3:
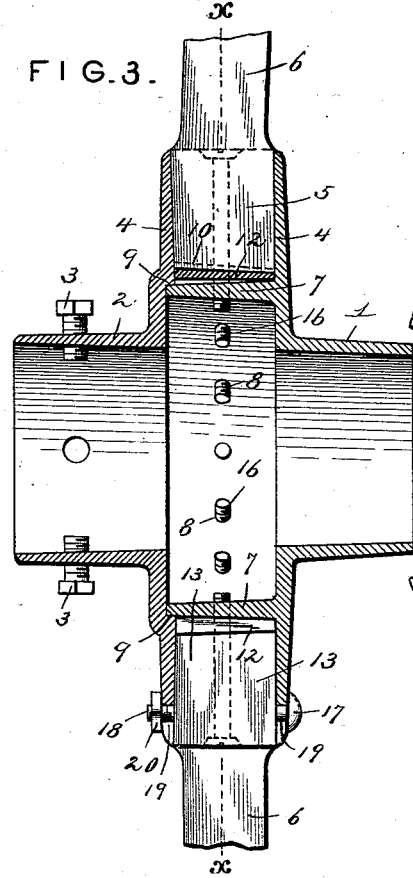
Figure 4:
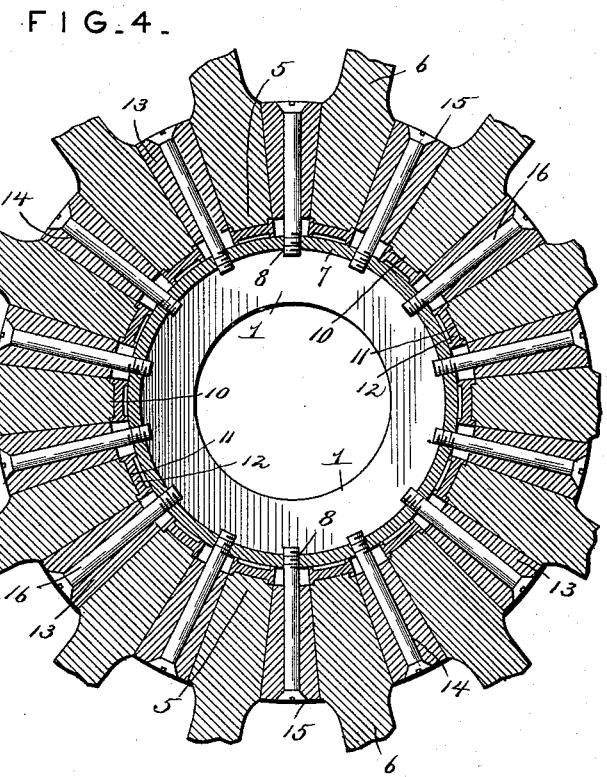
Figure 7:
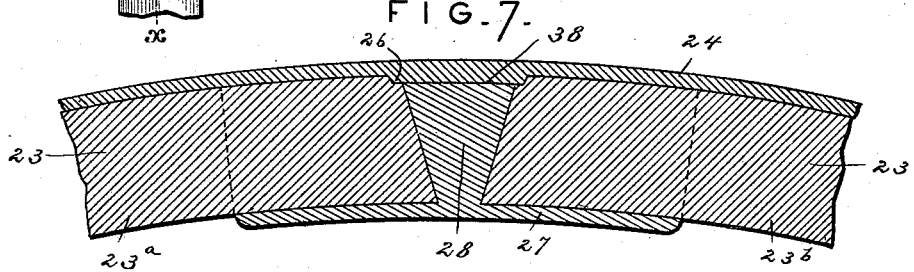
Figures 8, 9:
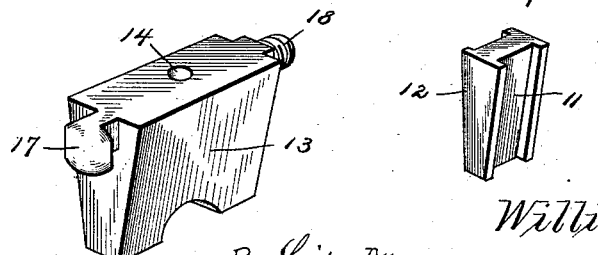

In the accompanying drawings, Figure 1 is a perspective view of a vehicle-wheel constructed in accordance with this invention, the rim or felly of the wheel being shown partly in section. Fig. 2 is a vertical sectional view of the wheel. Fig. 3 is an enlarged transverse sectional view of the hub of the wheel with the spokes in position. Fig. 4 is a similar view on the line *x x* of Fig. 3. Fig. 5 is an enlarged detail sectional view of that portion of the rim or felly including the rim-adjuster. Fig. 6 is a detail sectional view on the line *y y* of Fig. 5. Fig. 7 is an enlarged detail sectional view of that portion of the rim or felly including the connecting-clip therefor. Fig. 8 is a detail in perspective of one of the interposed key-wedges provided with the bolt-head and stud. Fig. 9 is a similar view of one of the channeled spoke-setting wedges.

Referring to the accompanying drawings, 1—2 designate respectively separate metallic hub members or sections that are provided with interior tapered bores that receive the axle box in the usual way, and one of said metallic hub members or sections accommodates in the collar portion thereof the set screws 3, which are adapted to work onto the boxing fitted within the hub to provide for truing up the same in position within the hub.

The metallic hub members or sections 1—2, are provided at their inner ends with the parallel clamp flanges or plates 4, between which are adapted to be clamped the inner tenon ends 5, of the wheel spokes 6, and the hub member or section 1, is further provided at its inner end with the circular base flange 7, that is projected from the inner side of the clamp flange or plate 4, of the section 1, and forms the base of the mortise inclosed between the parallel flanges or plates 4, of the opposing hub sections. The circular base flange 7, is provided therein with a peripheral series of threaded screw openings 8, and when the hub sections are clamped together onto the inner ends of the spokes the outer edge of said flange 7, is received in the annular shoulder 9, formed in the inner face of the clamp flange or plate of the hub section 2, so that the said hub sections interlock with each other and cannot possibly slip out of their relative positions as clamped together.

The inner tenon ends 5, of the spokes 6, are tapered in the usual squared shape and the inner extremities of the tenons 5, are provided with the projected ribs 10, that fit in the upper channeled or grooved sides 11, of the channeled or grooved setting wedges 12, which wedges 12, are driven under the inner ends of the spokes between the same and the circular base flange 7, so as to set the spokes out tight against the rim or felly of the wheel as will be apparent. The inner tenon ends 5, of the spokes that are set out from the base flange of the hub by means of the wedges 12, do not meet each other within the mortise of the hub, but are held spaced apart and tightly wedged together by means of the interposed key wedges 13. The key wedges 13, conform in shape to the tenon ends 5, and snugly register in the spaces between the said tenon ends 5, in order to tightly wedge the same in position within the mortise of the hub, and said key wedges 13, are adapted to be driven firmly in position between the spoke tenons so that their outer ends will lie substantially flush with the peripheries of the flanges or plates 4. The key wedges 13, are provided therein with the central screw openings or holes 14, that extend entirely therethrough and are countersunk at their outer ends as at 15, to receive the heads of the binding screws 16, that are passed through the screw openings or holes 14, and have their inner threaded extremities engaged in the threaded screw openings 8, of the base flange 7, in order to hold the wedges 13, frmly secured in their driven positions between the tenons 5, of the spokes 6.

Certain of the key wedges 13, are provided at one side with the integral bolt heads 17, and at directly opposite sides with the integral threaded bolt studs 18, that are aligned with the bolt heads 17. The aligned bolt heads 17, and the studs 18, of the key wedges provided therewith, are adapted to be received in the peripheral bolt notches 19, formed at intervals in the peripheries of the clamp flanges or plates 4, when the said key wedges are driven in position within the mortise of the hub, and said bolt studs 18, are adapted to be removably engaged at one side of one of said flanges or plates 4, by the clamp nuts 20, which are screwed tight onto the said studs 18, and provide means together therewith for detachably clamping the hub sections together, and the inner tenon ends of the spokes between the said flanges or plates 4. By removing the nuts 20, the hub section 2, may be readily disconnected or detached from the wheel so that any one spoke can be quickly removed and replaced, or the wheel otherwise adjusted without the services of a blacksmith.

The wheel spokes 6, have fitted onto the outer ends thereof the metallic spoke sockets 21, that are provided at their closed ends with the semi-circular or half-rounded forks 22, that embrace the inner rounded sides of the wheel rim or felly 23, that is encircled by the metallic tire 24.

It is to be observed that the wheel rim or felly 23, is not pierced by holes or recesses for the connection of the spokes thereto, which spokes are set out tight against the said rim or felly by means of the wedge devices already described. The wheel rim or felly 23, is made in two sections 23ª and 23ᵇ, as is usual, and at regularly spaced intervals the sections of the rim or felly are provided with the peripheral notches or seats 25, to receive the lug plates 26, that are welded or otherwise suitably secured on the inner side of the tire 24, to connect the same with the felly or rim by a non-slipping connection, so that the tire will not slip on the felly during the adjustments of the wheel, as will be obvious.

The adjacent ends of the rim or felly sections at one extremity threof are received in the opposite portions of the connecting clip 27, that embraces the rim or felly of the wheel at one extremity of its sections, and said connecting clip is provided at a point intermediate of its ends with a wedge shaped spacing block 28, that divides the connecting clip into two socket portions and separates the adjacent ends of the rim or felly sections from each other, while at the same time permitting said sections to be adjusted to tighten or loosen the wheel in a manner now to be described.

The adjacent ends of the rim or felly sections opposite the connecting clip are received in the socketed adjusting caps 29, that are fitted onto these ends of the rim or felly sections. The adjusting caps 29, are provided in their inner adjacent ends with the threaded screw openings 30, that respectively receive opposite portions of the right and left adjusting screw 31, that is provided at an intermediate point between the adjacent ends of said caps with a squared adjusting nut 32, that provides for the attachment of a wrench or other suitable tool for turning the screw 31, to tighten or loosen the rim or felly sections. The said nut 32, is adapted to have loosely fit thereover the correspondingly shaped eye 33, of the eye lock-bolt 34, the threaded shank of which is adapted to project through an opening 35, formed in the U-shaped cap-clip 36, that removably embraces the adjacent ends of the adjusting caps 29, to cover and inclose the adjusting device for the wheel rim or felly. The threaded shank of the eye-bolt 34, is adapted to receive thereon the nut 37, which works outside of the clip 36, and holds the same in position. By removing the nut 37, the clip 36, may be readily removed to provide access to the adjusting screw, and when the parts are positioned as described, the adjusting screw is locked against rotation, thereby holding the rim or felly tight as adjusted.

Both the adjusting caps 29 and the connecting clip 27, may be provided with notches or recesses 38, to receive the lug plates 26, of the tire located at those points of the rim or felly, as can be seen from the drawings.

From the above it will be obvious that the entire wheel described can be readily taken apart and set up again, and in the event of the wheel becoming loose, it is simply necessary to take off the hub section 2, expand or tighten the rim or felly within the tire, and drive small wedges in at the inner ends of the spokes to set the same out tight against the rim or felly, and it is to be understood that changes in the form, proportion and the minor details of construction may be resorted to without departing from the principle or sacrificing any of the advantages of this invention.

Having described the invention, what is claimed, and desired to be secured by Letters Patent, is—

1. In a vehicle wheel, the combination of separate hub sections provided at their inner ends with parallel clamp flanges, and one of said sections being further provided with a circular base flange, the spokes having inner tenon ends fitting in the mortise between said clamp flanges, setting wedges fitted between the inner extremities of said tenon ends and said base flange, and key wedges removably interposed between the adjacent tenon ends of the spokes, certain of said key wedges being provided with bolt portions having a connection with said clamp flanges to provide for separably clamping the hub sections together, substantially as set forth.

2. In a vehicle wheel, the combination of a separable hub provided with parallel clamp flanges and a circular base flange between the clamp flanges, the spokes having inner tenon ends provided with projected ribs, channeled or grooved setting wedges embracing said projected ribs and driven between the spoke tenons and said base flange, and key wedges removably interposed between the adjacent tenon ends of the spokes, substantially as set forth.

3. In a vehicle wheel, a separable hub provided with parallel clamp flanges, and a circular base flange between the clamp flanges and having a peripheral series of threaded screw openings, the spokes having inner tapered tenon ends fitted between said clamp flanges, removable key wedges interposed between the adjacent tenon ends of the spokes and provided with screw openings or holes extending therethrough, and binding screws passed through the openings or holes in the key wedges and engaging the threaded screw openings in said base flange, substantially as set forth.

4. In a vehicle wheel, a separable hub provided with parallel clamp flanges having peripheral bolt notches, and with a circular base flange between the clamp flanges, the wheel spokes having inner tenon ends received between said clamp flanges, key wedges interposed between the adjacent tenon ends of the spokes, certain of said wedges being provided at one side with integral bolt heads and at directly opposite sides with integral threaded bolt studs which are received in the peripheral notches of said clamp flanges, and clamp nuts engaging said bolt studs at one side of one of said clamp flanges, substantially as set forth.

5. In a vehicle wheel, the combination with the adjacent ends of two rim or felly sections; of adjusting caps fitted onto said ends and provided with threaded screw openings, a right and left adjusting screw engaging the threaded openings of said caps and provided with an intermediate squared adjusting nut, an eye-bolt provided with an integral squared eye adapted to snugly and removably embrace said nut, a U-shaped cap clip embracing said adjusting caps and provided with an opening adapted to receive the threaded shank of said eye-bolt, when the eye thereof is engaged with the adjusting nut and a nut mounted on the threaded shank of said eye-bolt and working outside of said cap clip to secure the latter in place and retain the eye of the eye-bolt on the adjusting nut, substantially as set forth.

In testimony that I claim the foregoing as my own I have hereto affixed my signature in the presence of two witnesses.

WILLIAM HORSLEY.

Witnesses:
RANSOM WALKER,
WM. EGGLESTON.